United States Patent Office 3,123,630
Patented Mar. 3, 1964

3,123,630
PROCESS FOR PREPARING HYDROXYALKYL MONOESTERS OF POLYOLEFIN THIONOPHOSPHONIC ACIDS
Frederick G. Oberender, Fishkill, and David D. Reed, Glenham, N.Y., assignors to Texaco Inc., New York, N.Y., a corporation of Delaware
No Drawing. Filed Oct. 21, 1960, Ser. No. 63,973
7 Claims. (Cl. 260—461)

This invention relates to a process for preparing mono-hydroxyalkyl hydrocarbyl thiophosphonates. More particularly, it relates to a process for preparing mono-hydroxyalkyl hydrocarbyl thiophosphonates by reaction of alkylene oxides with hydrocarbyl thiophosphonic acids.

In a commonly-assigned copending application Serial No. 59,505, which was filed September 30, 1960, in the names of R. G. Lacoste, H. D. Kluge, and E. E. Schallenberg, mono-hydroxyalkyl hydrocarbyl thiophosphonates are claimed as novel compounds. The subject application is directed to a process for preparing these novel compounds by non-catalytic reaction of alkylene oxides with hydrocarbyl thiophosphonic acids.

In accordance with the process of this invention, mono-hydroxyalkyl hydrocarbyl thiophosphonates are prepared by reacting hydrocarbyl thiophosphonic acids with alkylene oxides in the absence of a catalyst. The reaction between alkylene oxides and hydrocarbyl thiophosphonic acids in the absence of a catalyst proceeds essentially on an equimolar basis to form mono-hydroxyalkyl hydrocarbyl thiophosphonates. The process of the invention involving non-catalytic reaction of hydrocarbyl thiophosphonic acids and alkylene oxides to form mono-hydroxyalkyl thiophosphonates is illustrated by the following equation:

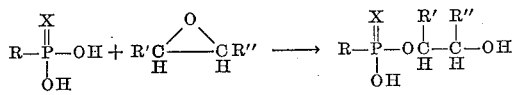

wherein R is a monovalent hydrocarbyl radical, R′ and R″ are hydrogen or a monovalent aliphatic hydrocarbyl radical containing 1–6 carbon atoms and X is sulfur or a mixture of sulfur and oxygen.

Hydrocarbyl thiophosphonic acids are derived from the reaction products of aromatic hydrocarbons, cycloaliphatic hydrocarbons and aliphatic hydrocarbons with $P_2S_5$ at elevated temperatures. Although a wide variety of hydrocarbons such as aliphatic-substituted aryl compounds and aryl-substituted aliphatic compounds are usable as the hydrocarbon reactant, olefins are generally employed as the hydrocarbon reactant. Lubricating oil fractions constitute another preferred class of materials for reaction with $P_2S_5$ to form a product which, after further treatment as outlined below, is converted to hydrocarbyl thiophosphonic acids.

The olefinic hydrocarbons reacted with $P_2S_5$ usually contain at least 12 carbon atoms although lower molecular weight olefins can be employed. Monoolefin polymers such as isobutylene polymer, butylene polymer, propylene polymer and copolymers of monoolefins such as propyleneisobutylene copolymer are particularly preferred materials for reaction with $P_2S_5$. In general, monoolefin polymers and copolymers having an average molecular weight between about 250 and 50,000 are employed with polymers and copolymers having an average molecular weight in the range from about 600 to 5000 being particularly preferred. Copolymers of conjugated dienes and monoolefins such as a copolymer of butadiene and isobutylene having an average molecular weight in the above-prescribed range also react with phosphorus pentasulfide. Particularly preferred olefin polymers are isobutylene polymers having average molecular weights between 600 and 5000.

Olefins useful for reaction with $P_2S_5$ are also prepared by halogenation of high molecular weight hydrocarbon fractions and subsequent dehydrohalogenation. Olefin fractions obtained by cracking of high molecular weight hydrocarbon fractions may also be used as the hydrocarbon reactant.

The reaction product obtained by reacting about 5 to about 40 percent $P_2S_5$ with a hydrocarbon at a temperature of from about 100–320° C. in a non-oxidizing atmosphere, for example, under a blanket of nitrogen, is hydrolyzed at a temperature between about 100 and 260° C. by contact with steam. Steam treatment hydrolyzes the hydrocarbon-$P_2S_5$ reaction product to a hydrocarbyl thiophosphonic acid and inorganic phosphorus acids. The hydrocarbyl thiophosphonic acid has the general formula:

wherein R is the charge hydrocarbon radical, usually an olefinic radical containing 20 to 200 carbon atoms, and X is sulfur or a mixture of oxygen and sulfur. X in the above formula is designated as sulfur or a mixture of sulfur and oxygen because the steam hydrolysis step usually results in replacement of a portion of the sulfur joined to phosphorus with oxygen.

The inorganic phosphorus acids formed during hydrolysis are removed prior to reaction with the alkylene oxide. A number of different procedures are available for removal of the inorganic phosphorus acids. In commonly-assigned copending application Serial No. 750,874, filed July 25, 1958, by H. D. Kluge, J. W. Wisner, Jr., and R. G. Lacoste, now U.S. Patent 2,987,512, and U.S. 2,951,835, issued September 6, 1960, by the same inventors, removal of the inorganic phosphorus acids is effected by contact with synthetic hydrous alkaline earth metal silicates and synthetic hydrous alkali metal silicates, respectively. Another commonly-assigned copending application Serial No. 841,668, filed September 23, 1959, by H. D. Kluge and R. G. Lacoste, describes a process wherein inorganic phosphorus acids are removed from the hydrolyzed product by extraction with anhydrous methanol.

Alkylene oxides which react in the absence of a catalyst with hydrocarbyl thiophophonic acids on an equimolar basis to form the novel mono-hydroxyalkyl thiophosphonates of this invention are represented by the general formula:

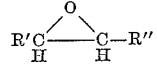

wherein R′ and R″ are hydrogen or an aliphatic hydrocarbyl radical containing 1–6 carbon atoms. Examples of effective olefin oxides are the following: Ethylene oxide, propylene oxide, 1,2-butylene oxide, 2,3-butylene oxide, 1,2-pentylene oxide, 2,3-pentylene oxide, 1,2-hexylene oxide, 3-methyl-1,2-pentylene oxide, 2,3-octylene oxide, 4-methyl-2,3-octylene oxide, 4-methyl-1,2-hexylene oxide and 3-methyl-1,2-butylene oxide.

Non-catalytic reaction of olefin oxides with hydrocarbyl thiophosphonic acids to produce mono-hydroxyalkyl hydrocarbyl thiophosphonates is effected at a temperature between about 60 and 150° C. with temperatures of 80 to 125° C. being preferred. Atmospheric and superatmospheric pressures are employed for the reaction with pressure between about 10 and 500 lbs. p.s.i.g. being advantageous with the lower alkylene oxides.

The non-catalytic preparation of mono-hydroxyalkyl hydrocarbyl thiophosphonates is generally effected by adding an excess of olefin oxide to the hydrocarbyl thiophosphonic acid prepared by steam hydroylsis of a hydrocarbon-$P_2S_5$ reaction product and subsequent removal of inorganic phosphorus acids from the hydrolyzed product. The mol ratio of olefin oxide to acid in the reaction mixture varies between 1 and 4 but usually falls between 1.1 and 1.5. Excess olefin oxide is removed after completion of reaction by blowing the reaction mixture at elevated temperatures, generally with an inert gas such as nitrogen.

Examples 1 and 2 illustrate the preparation of hydrocarbyl thiophosphonic acids from polybutenes of different molecular weight. The remaining examples show the preparation of mono-hydroxyalkyl hydrocarbyl thiophosphonates by non-catalytic reaction of olefin oxides with the thiophosphonic acids prepared in Examples 1 and 2.

*Example 1.*—A polybutene-$P_2S_5$ reaction product was prepared by reacting polybutene having an average molecular weight of about 780 with $P_2S_5$ in a mol ratio of polybutene to $P_2S_5$ in a mol ratio of polybutene to $P_2S_5$ of 1.1 and in the presence of sulfur in an amount equal to 1.3 weight percent of polybutene. After reaction at 450° F., until the mixture is soluble in n-pentane, the reaction product was diluted with approximately 140 weight percent of a naphthene base oil having a SUS at 100° F. of 100, steamed at 350° F. for 10 hours in a nitrogen atmosphere, and then dried by passage of nitrogen therethrough at 350° F. The hydrolyzed product was extracted with 50% by volume of methyl alcohol at 140° F. to give a methanol extract containing inorganic, phosphorus acids and a lubricating oil raffinate containing olefin $P_2S_5$ product which after stripping free of methanol had a neut. no. of 24.8.

*Example 2.*—A polybutene thiophosphonic acid was prepared by a similar procedure from a polybutene having an average molecular weight of about 940. The resulting lubricating oil raffinate prepared in this example had a neut. no. of 23.1.

*Example 3.*—Polybutene (average molecular weight 780) thiophosphonic acid prepared as in Example 1 in the amount of 2900 g. (1.5 mols) was charged to a 5-liter, 3-necked flask equipped with a stirrer, a gas inlet tube extending below the surface of the acid reactant, a thermometer immersed in the acid, and a Dewar reflux condenser cooled with a Dry Ice-acetone mixture. The acid was heated to 121° C. over a ½-hour period with concurrent stirring and nitrogen blowing at approximately 1 liter per minute. While the temperature in the flask was maintained at 121° C. and the nitrogen flow rate was reduced to 5 or 10 ml./minute, ethylene oxide was passed through a trap in which it was mixed with the nitrogen and introduced into the reaction flask at a rate so as to maintain a gentle reflux. When ethylene oxide was no longer taken up as evidenced by an increase in the reflux rate, its addition was stopped and the excess ethylene oxide in the reaction mixture allowed to reflux for 1 hour. At the end of this period, ethylene oxide remaining in the reaction flask was flushed therefrom by passing nitrogen through the reaction mixture for ½ hour at a rate of 1 liter/minute. The excess ethylene oxide was recovered in a Dry Ice-acetone trap attached to the outlet of the Dewar reflux condenser.

The product was then stripped at about 150° C. and 2–3 mm. mercury pressure. On cooling there was obtained a reaction product which was shown by analysis to consist primarily of mono(2-hydroxyethyl)polybutenethiophosphonate of the following formula:

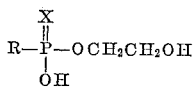

wherein R is the polybutene radical of 780 average molecular weight and X is a mixture of sulfur and oxygen.

This product analyzed as follows:

|  | Calculated | Found |
| --- | --- | --- |
| Neut. No. | 0.0 | 1.0 |
| Hydroxyl No. | 28 | 23 |
| Percent Phosphorus | 1.56 | 1.83 |
| Percent Sulfur [1] | 1.60 | 0.74 |

[1] In this and subsequent analyses "calculated sulfur" is on basis that X is all sulfur.

*Example 4.*—1300 grams (0.5 m.) of the polybutene (average molecular weight of 940) thiophosphonic acid prepared as in Example 2 was reacted with 40 grams (0.56 m.) of 1,2-butylene oxide by a procedure similar to that employed in Example 3 with the exception that the butylene oxide was added via a dropping funnel. As a result of this reaction there was obtained a mono-hydroxybutyl polybutenethiophosphonate of the general formula:

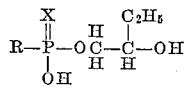

wherein R is a polybutene of 940 average molecular weight and X is a mixture of sulfur and oxygen. This product analyzed as follows:

|  | Calculated | Found |
| --- | --- | --- |
| Neut. No. | 0.0 | 2.88 |
| Hydroxyl No. | 21 | 15 |
| Percent Phosphorus | 1.16 | 0.94 |
| Percent Sulfur | 1.47 | 0.61 |

*Example 5.*—375 g. (0.18 mol) of the polybutene thiophosphonic acid prepared as in Example 1 was charged to a 3-necked flask equipped with a stirrer, Friedrich's condenser and a funnel extending below the surface of the acid. 50 ml. (0.72 mol) of propylene oxide was added dropwise to the acid at a temperature of about 90° C. over a 2.5 hour period. The excess propylene oxide was allowed to reflux for an additional hour at 100° C. The product was stripped of excess propylene oxide by heating to 190° C. at 28 mm. mercury pressure. The resulting product was shown by analysis to consist essentially of a mono-hydroxypropyl polybutenethiophosphonate of the following formula:

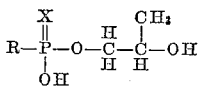

wherein R is the polybutene radical having an average molecular weight of 780 and X is a mixture of sulfur and oxygen. This product analyzed as follows:

|  | Calculated | Found |
| --- | --- | --- |
| Neut. No. | 0 | 2.55 |
| Hydroxyl No. | 24 | 22 |
| Percent Phosphorus | 1.34 | 1.20 |
| Percent Sulfur | 1.38 | 0.65 |

*Example 6.*—Approximately 15 gallons of a polybutene (average molecular weight 940) thiophosphonic acid similar to that prepared in Example 2 was reacted in 6000 g. batches with ethylene oxide in a 12-liter, 3-necked flask equipped with a stirrer, gas inlet tube and a thermometer. Air was removed from the system by heating to 93° C. while blowing with nitrogen. After addition of a Dewar reflux condenser containing a Dry Ice-acetone mixture to the system, ethylene oxide was added at a rate sufficient to maintain a gentle reflux from the condenser. The nitrogen flow was reduced to a trickle during the ethylene oxide addition. When rapid reflux of ethylene oxide was noted, ethylene oxide addition was stopped and the reaction mixture allowed to reflux for approximately 2 hours to assure completion of reaction. Excess ethylene oxide was then removed from the reaction mixture by increasing the nitrogen rate and blowing for 2 hours at a temperature of approximately 93° C. After 2 hours of nitrogen blowing, the product was cooled to room temperature. This procedure was repeated until 15 gallons of mono-hydroxyethyl polybutene thiophosphonate was obtained for subsequent engine testing. Analysis of a composite sample gave the following results:

|  | Calculated | Found |
|---|---|---|
| Neut. No. | 0.0 | 0.69 |
| Hydroxyl No. | 17 | 21 |
| Percent Phosphorus | 0.96 | 0.93 |
| Percent Sulfur | 0.99 | 0.62 |

Further proof of the structure of this material as mono(2-hydroxyethyl) polybutene thiophosphonate was obtained by infra-red analysis.

We claim:

1. A process for preparing a mono-hydroxyalkyl hydrocarbyl thiophosphonate having the formula:

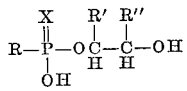

by reacting an alkylene oxide having the formula:

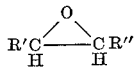

with a hydrocarbyl thiophosphonic acid having the formula:

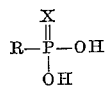

in the absence of a catalyst at a temperature between 60 and 150° C. and at a pressure between atmospheric and 500 p.s.i.g., in the above formulas R being a hydrocarbyl radical derived from polyolefin having an average molecular weight between 250 and 50,000, X being selected from the group consisting of sulfur and a mixture consisting of a major portion of sulfur and a minor portion of oxygen and R' and R'' being selected from the group consisting of hydrogen and an aliphatic hydrocarbyl radical containing 1–6 carbon atoms said alkylene oxide being employed in the reaction in an excess over the stoichiometric required for the formation of said mono-hydroxyalkyl hydrocarbyl thiophosphonate.

2. A process according to claim 1, in which the mol ratio of alkylene oxide to hydrocarbyl thiophosphonic acid is between 1.1 and 1.5.

3. A process according to claim 1 in which R is derived from an isobutylene polymer having an average molecular weight between 600 and 5000.

4. A process according to claim 1 in which said alkylene oxide is ethylene oxide.

5. A process according to claim 1 in which said alkylene oxide is propylene oxide.

6. A process according to claim 1, in which said alkylene oxide is 1,2-butylene oxide.

7. A process for preparing mono-hydroxyalkyl hydrocarbyl thiophosphonate which comprises reacting $P_2S_5$ with a polyolefin having an average molecular weight between 250 and 50,000, hydrolyzing said $P_2S_5$-polyolefin reaction product by contact with steam, separating inorganic phosphorus acids from said hydrolyzed reaction product and reacting an alkylene oxide with the resulting hydrocarbyl thiophosphonic acid at a temperature between 60 and 150° C., a pressure between atmospheric and 500 p.s.i.g. and in the absence of a catalyst to form a mono-hydroxyalkyl hydrocarbyl thiophosphonate.

References Cited in the file of this patent

UNITED STATES PATENTS

| 2,424,402 | Loane et al. | July 22, 1947 |
| 2,683,168 | Jensen et al. | July 6, 1954 |
| 2,795,609 | Jensen et al. | June 11, 1957 |
| 2,895,983 | Asseff | July 21, 1959 |
| 2,965,664 | Butler | Dec. 20, 1960 |